No. 847,868. PATENTED MAR. 19, 1907.
C. H. WHEELER.
CULTIVATOR.
APPLICATION FILED DEC. 4, 1905.
2 SHEETS—SHEET 1.
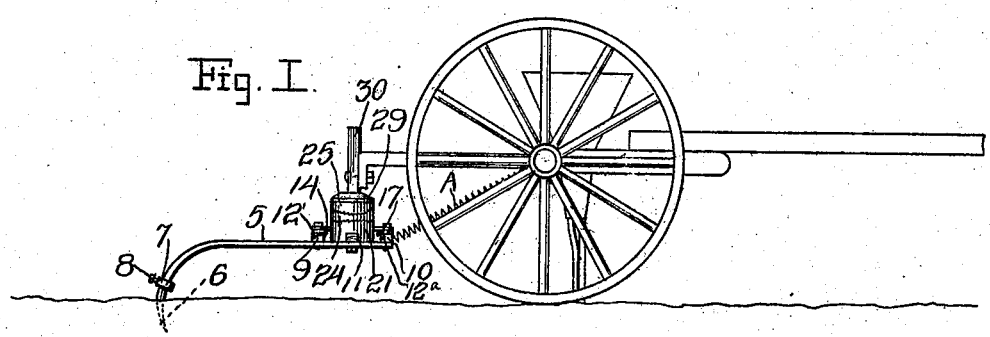
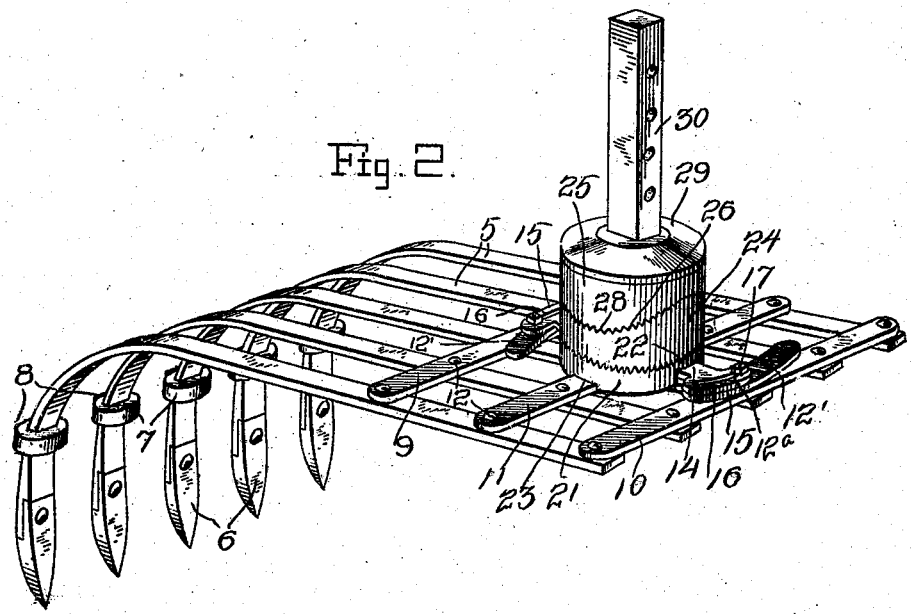

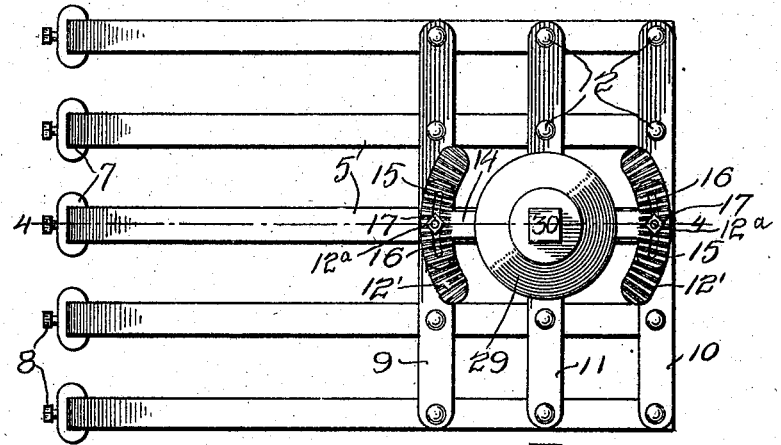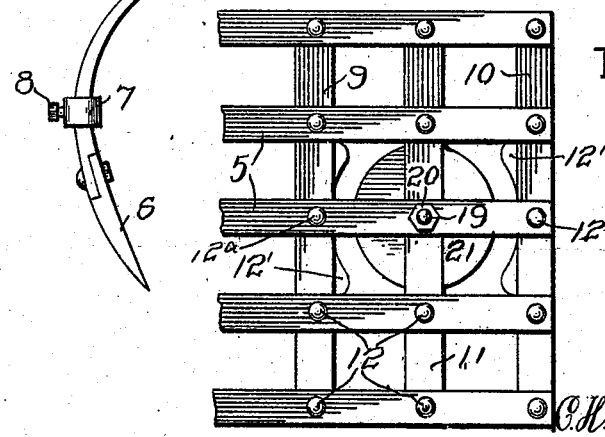

UNITED STATES PATENT OFFICE.

CLAUD H. WHEELER, OF WILLS POINT, TEXAS.

CULTIVATOR.

No. 847,868.

Specification of Letters Patent.

Patented March 19, 1907.

Application filed December 4, 1905. Serial No. 290,210.

*To all whom it may concern:*

Be it known that I, CLAUD H. WHEELER, a citizen of the United States, residing at Wills Point, (R. F. D. No. 6,) in the county of Van Zandt, State of Texas, have invented certain new and useful Improvements in Cultivators; and I do hereby declare the following to be a full, clear, and exact description of the invention, such as will enable others skilled in the art to which it appertains to make and use the same.

This invention relates to farm apparatus, and more particularly to cultivators, and has for its object to provide a cultivating attachment which may be used in connection with other machines to cultivate the ground at the same time that the machine to which it is attached is in use.

Another object is to provide a cultivating attachment of this kind which will be susceptible of various adjustments to suit different conditions.

Other objects and advantages will be apparent from the following description.

In the drawings forming a portion of this specification, and in which like numerals of reference indicate similar parts in the several views, Figure 1 is a side elevation of a drill to which the present cultivator is attached. Fig. 2 is a perspective view of the cultivator removed from the drill. Fig. 3 is a top plan view of the attachment. Fig. 4 is a central longitudinal section taken on line 4 4 of Fig. 3, the teeth being adjusted to enter the ground to the furthest extent. Fig. 5 is a bottom plan view of the forward ends of the tooth-arms and the adjusting elements.

Referring now to the drawings, the present invention comprises a plurality of longitudinally-extending spaced tooth-carrying arms 5, the forward portions of which are disposed horizontally, while their rearward portions are curved downwardly to occupy vertical positions at their extremities, where are removably secured thereto ground-treating devices 6, which are shown as teeth. Collars 7 are slidably engaged with the arms above the devices 6 and are movable toward and away from the latter, set-screws 8 being provided to hold them at different points of their movement, the office of these collars being to prevent loose earth from following up the arms 5.

The forward horizontal portions of the arms 5 have pivotally secured thereupon a pair of transversely-extending longitudinally-spaced cross-beams 9 and 10, respectively, the former being located rearwardly of the latter, and between these cross-beams and in spaced relation thereto there is secured upon the arms 5 a third beam 11, the connection of these several beams with the arms 5 being through the medium of bolts 12, arranged to permit of pivotal motion of the arms with respect to the beams. Coinciding arcuate plates 12' are secured longitudinally upon the beams 9 and 10 at their centers, and these plates have perforations 13 therein which receive two long bolts 12$^a$ therethrough, these bolts being engaged in the arm 5 lying below the arcuate plates 12'. A plate 14 has laterally-broadened end portions 15, which are disposed upon the arcuate plates 12', the plate 14 thus extending longitudinally of the cultivator, and formed in the broadened end portions 15 of the plate there are transverse arcuate slots 16, in which the last-mentioned bolts 12$^a$ are engaged. The opposite faces of the end portions 15 are serrated, as are also the upper faces of the plates 12', and clamping-nuts 17, having serrated under faces, are engaged with these bolts above the end portions 15 of the plate 14 and are operable to clamp the several parts against movement. It will be seen, however, that when the nuts 17 are loosened the cross-beams 9 and 10 may be shifted longitudinally in opposite directions to bring the teeth 6 into a diagonal line.

Alining perforations are formed through the arm 5 which lies beneath the plates 12', the beam 11, and the plate 14, and engaged in these perforations there is a threaded rod 19, having a nut 20 engaged at its lower end. A disk 21 is engaged with the rod 19 above the plate 14 and has a passage 22 in its under surface which receives this plate, the disk having a second passage 23 in its under surface, at right angles to the passage 22, which receives the central cross-beam 11, this beam and the plate 14 being thus held against movement with respect to each other. The upper surface of the disk 21 is serrated radially, and a second disk 24, having a correspondingly-serrated under surface, is engaged with the rod 19 above the disk 21. The upper surface of the disk 24 is concave, being cylindrically curved diametrically of the disk, and the disk is shiftable upon the rod 19 to cause the line of curvature of its upper surface to extend in any direction in the plane of the disk 21.

The disk 25, having a convex lower surface 26 corresponding to the concavity of the upper surface of the disk 24, is provided with a diametrical slot 27 and extending in the line of curvature of its under surface, and this slot is broadened, as shown at 27', at its upper portion. The under face 26 of the disk 25 rests against the upper surface of the disk 24, and these two surfaces are provided with intermeshing serrations 28, which extend transversely of the line of curvature of the faces.

Secured upon the upper face of the disk 25 there is a plate 29, which closes the broadened portion of the slot 27. This slot receives the upper portion of the rod 19, the broadened portion of the slot receiving a head 19', which is carried by the rod. An attaching-shank 30 is carried by the plate 29, and it is by means of this shank that the cultivator is secured to a drill or other machine.

In use when it is desired to vary the extent to which the devices 6 enter the ground a nut 31, which is engaged with the rod 19 below the arm 5 through which it passes, is loosened, and the disk 25 may then be rocked with respect to the disk 24 to give the correct pitch to the arms 5. If it is desired that the devices 6 at one side of the cultivator shall enter the ground further than those at the other, the disk 21 and the arms 5 may be revolved with respect to the disk 24 and the parts thereabove, which will produce the desired result, as will be readily understood.

A supporting-spring A may be engaged with the cultivator and with the machine to which it is attached, as shown in Fig. 1.

What is claimed is—

1. A cultivating attachment for farm implements, comprising spaced longitudinally-extending arms, ground-treating devices carried by the rearward ends of the arms, longitudinally-spaced transverse beams pivoted to the forward portions of the arms, a transverse beam pivoted to the arms between the first-named beams, said first-named beams being movable longitudinally in opposite directions to vary the positions of the ground-treating devices with respect to each other, means for holding the ground-treating devices at different points of their movement with respect to each other, an attaching-shank, connections between said shank and the arms for rocking movement of the arms with respect to the shank and for pivotal movement of the arms with respect to the shank, and means for holding the arms at different points of their rocking and pivotal movements.

2. In a cultivator, the combination with a supporting member, of a disk carried by the lower end of the member and having a convex cylindrically-curved under surface, a disk disposed beneath the first-named disk and having its upper surface curved to conform to the curvature of the under surface of the first-named disk, intermeshing serrations carried by the curved faces of the two disks, connections between the disks arranged to permit of rocking motion thereof with respect to each other, ground-treating devices connected with the second-named disk for pivotal motion with respect thereto, and means for holding the devices against movement at different points of their pivotal motion and for holding the two disks against movement at different points of their rocking motion with respect to each other.

3. In a cultivator attachment for farm-machines, the combination with ground-treating devices arranged for movement to lie in different positions with respect to each other, of means for holding the devices at different points of their movement, an attaching-shank connected with the devices for pivotal and rocking movement with respect thereto, and means for holding the shank against both movements.

In testimony whereof I affix my signature in presence of two witnesses.

CLAUD H. WHEELER.

Witnesses:
 CHAS. W. ASHWORTH,
 CORNELIUS E. FARRELL.